United States Patent [19]
Grove et al.

[11] 3,765,647
[45] Oct. 16, 1973

[54] VALVE CONSTRUCTION AND METHOD

[75] Inventors: Marvin H. Grove; Kee W. Kim, both of Houston, Tex.

[73] Assignees: M & J Valve Company; M & J Development Company, Houston, Tex.

[22] Filed: Jan. 21, 1972

[21] Appl. No.: 219,635

Related U.S. Application Data
[63] Continuation-in-part of Ser. No. 176,801, Sept. 1, 1971, abandoned.

[52] U.S. Cl. .................................. 251/317, 251/328
[51] Int. Cl. ............................................. F16k 5/00
[58] Field of Search ................... 251/317, 362, 174, 251/175, 328, 363, 364, 360

[56] References Cited
UNITED STATES PATENTS

| | | | |
|---|---|---|---|
| 3,050,077 | 8/1962 | Wheatley | 251/328 X |
| 2,925,994 | 2/1960 | Downs et al. | 251/364 X |
| 2,861,773 | 11/1958 | Clade | 251/315 |
| 3,210,042 | 10/1965 | Freeman | 251/175 |
| 3,618,893 | 11/1971 | Bols | 251/364 X |
| 2,778,598 | 1/1957 | Bolling, Jr. | 251/364 X |
| 3,054,594 | 9/1962 | Hecht | 251/362 X |
| 3,131,906 | 5/1964 | King | 251/360 |
| 3,421,733 | 1/1969 | Stewart, Jr. | 251/363 X |
| 3,565,392 | 2/1971 | Bryant et al. | 251/174 X |

*Primary Examiner*—Samuel Scott
*Attorney*—Paul D. Flehr et al.

[57] ABSTRACT

A valve (e.g., gate or ball) having a sealing assembly including a rigid annular seat member and annular sealing means carried by the same. The resilient material of the sealing means is locked in place by lip portions that are bent or rolled over during manufacture. In a preferred embodiment the sealing means consists of a first assembly comprising a seal ring made of relatively hard resilient material (like nylon) an an annulus of more resilient material maintained in radial compression, together with another annular insert of resilient material which is concentric with the first assembly.

6 Claims, 14 Drawing Figures

Patented Oct. 16, 1973

Patented Oct. 16, 1973 3,765,647
4 Sheets-Sheet 2
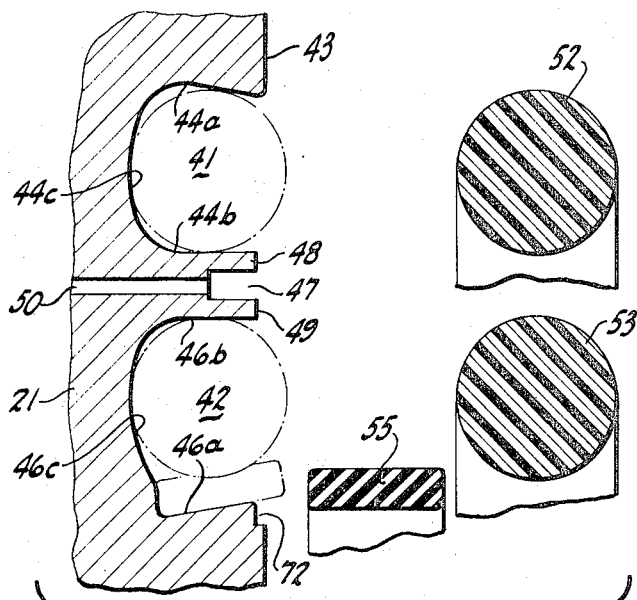
FIG-3
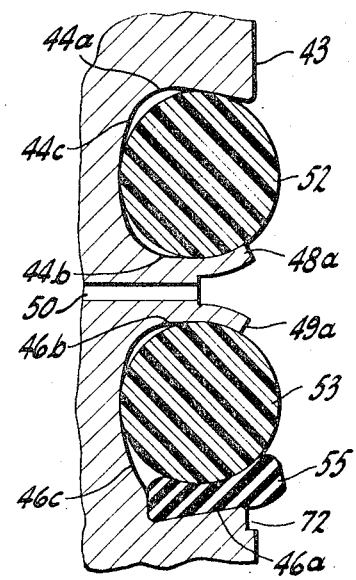
FIG-4
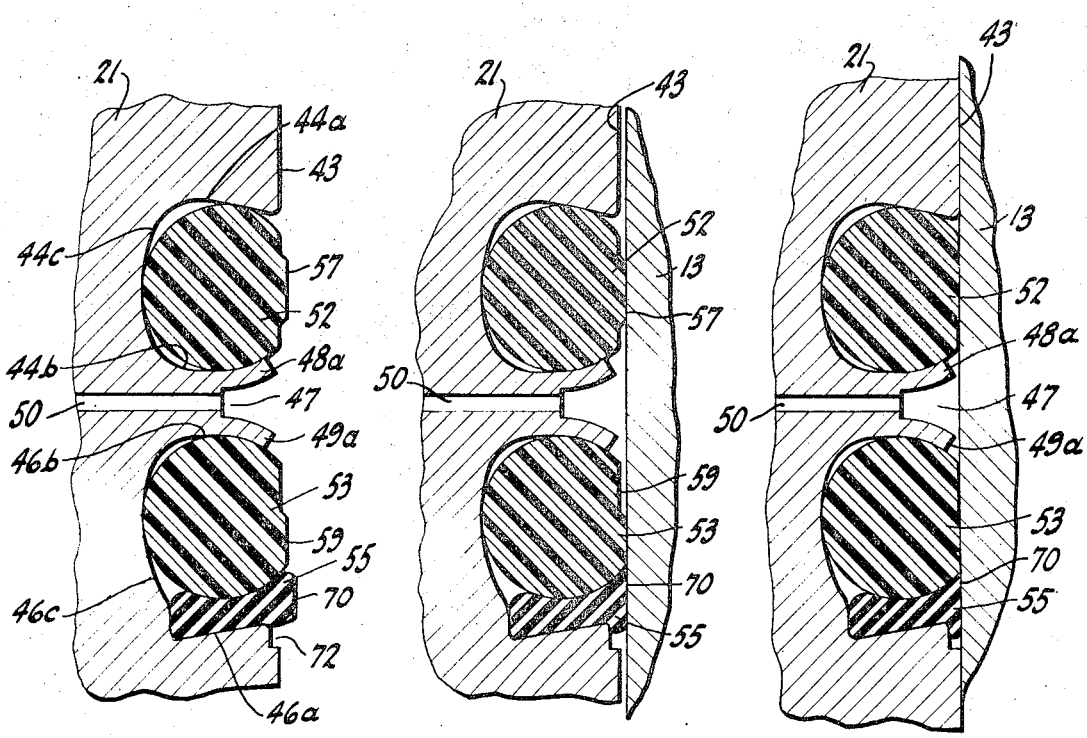
FIG-5
FIG-6
FIG-7

Patented Oct. 16, 1973

VALVE CONSTRUCTION AND METHOD

CROSS-REFERENCE TO RELATED APPLICATIONS

Reference is made to our copending application Ser. No. 17,365 filed Mar. 9, 1970, and application Ser. No. 176,801 filed on or about Sept. 1, 1971, (now abandoned) of which this application is a continuation-in-part.

BACKGROUND OF THE INVENTION

This invention pertains generally to valves for controlling fluid flow and to methods for manufacturing the same.

In the past, many valves of the gate or ball types have mployed sealing assemblies having members made of non-metallic material like nylon, Teflon, Kel-F, various elastomers and natural or synthetic rubber. Thus, a metal seat ring may be carried by the valve body and provided with an insert or cemented-in annulus of resilient material which is adapted to engage the valve working surface of the valve member (e.g., a gate or ball). A further seal, formed for example by one or more resilient O-rings, is established between the seat member and the valve body, and the seat member is normally urged toward the valve member by suitable spring means. In addition to relying upon spring means to urge the seat member toward the valve member, the diameter of the seal between the seat ring and the body can be so proportioned with respect to the effective mean diameter of the sealing area on the valve working surface that fluid pressure on the upstream side of the valve serves to urge the annular seat member toward the valve member. Assuming that the seat member is urged toward the valve member with the resilient material contacting the valve working surface of the valve member, the seal is effective with respect to differential pressure acting from the upflow side of the valve. It may also seal against differential pressure acting from the body space, or it may be urged by differential pressure acting from the body space to relieve body pressure.

In seal constructions of the type described above, it has also been proposed to provide resilient material on the seat ring whereby the seal is established on two adjacent concentric areas of the valve working surface. Such a sealing arrangement is disclosed, for example, in FIG. 15 of U.S. Pat. No. 3,269,695. One difficulty with such an arrangement is that when used on liquids pressure tends to become trapped or to build up between the two sealing areas. This tends to cause a type of erratic pumping action of the seat ring under certain conditions of operation. In other words, trapped or built-up fluid pressure between the sealing areas may induce erratic retracting movements of the annular seat member in order to relieve the pressure.

Another difficulty with sealing assemblies making use of resilient material is the difficulty involved in securing the resilient material to the metal seat member. Molded-in inserts are relatively expensive to manufacture, and various cementing mediums cannot be relied upon to effect a good bond. Pressing a resilient insert into a recess formed in the seat member is also difficult, particularly with the more resilient materials or assemblies of two or more materials. Such difficulties become greater when it is attempted to provide sealing means which engages the valve surface on two concentric areas.

In our copending application Ser. No. 17,365 filed Mar. 9, 1970, we have disclosed a resilient assembly carried by an annular seat member which involves use of a ring made of relatively hard resilient material like nylon, together with an annulus which is normally radially compressed and which is made or a more resilient material like a synthetic rubber. The assembly in that instance is pressed into a groove or recess formed in the seat ring, and the radial compression of the annulus is largely relied upon to retain the assembly upon the seat ring. One edge face of the more resilient annulus in that instance forms a seal with respect to the valve working surface of the associated valve member.

SUMMARY AND OBJECTS OF THE INVENTION

In general, it is an object of the present invention to provide a new and improved valve construction and method of manufacture, having reference particularly to the construction of the valve sealing means.

Another object of the invention is to provide a valve having sealing means including resilient material which is locked to an annular metal seat ring in a novel manner whereby molding and pressing-in operations are avoided.

Another object of the invention is to provide a stable sealing assembly which provides dual areas of engagement with the valve surface of the valve member.

Another object of the invention is to provide a valve having resilient sealing means mounted in recesses formed in the seat ring, and which is characterized by the use of lip means which is bent to lock the resilient assembly within its accommodating recess.

Another object of the invention is to provide a novel method for manufacturing valves incorporating resilient sealing means.

Additional objects and features of the invention will appear from the following description in which the preferred embodiments have been disclosed in detail in conjunction with the accompanying drawing.

BRIEF DESCRIPTION OF THE DRAWING

FIG. 3 is an enlarged exploded view in section illustrating the manner in which the parts are assembled to form the finished assembly.

FIG. 4 is a view like FIG. 3, but showing the seal rings and associated resilient annuluses disposed within their accommodating recesses.

FIG. 5 is an enlarged detail in section like FIG. 4 but showing the construction of the parts after trimming or machining operations.

FIG. 6 is an enlarged section like FIG. 5, but showing the resilient members in contact with the valve working surface.

FIG. 7 is an enlarged detail like FIG. 6 but showing the valve member being urged with greater force against the resilient members to provide direct metal-to-metal contact.

DESCRIPTION OF THE PREFERRED EMBODIMENTS

Figure 1:
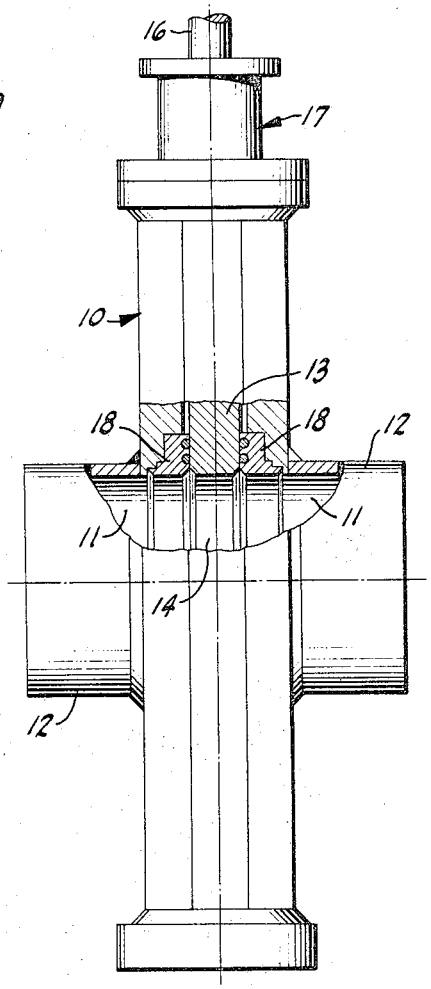
FIG. 1 is a side elevational view partly in section illustrating a gate valve incorporating the invention.

The gate valve illustrated in FIG. 1 includes a body 10 which in this instance is of the fabricated type, being made of mill steel shapes welded together. The end walls of the body are provided with flow passages 11 and are also shown provided with the hubs or transition pieces 12 for making connection with associated piping. Within the body there is a flat gate 13 which in this instance is provided with a port 14 which registers with the flow passages for full open position of the valve. The gate at its upper end is attached to an operating rod 16 which extends to the exterior of the valve through a bonnet assembly 17. Annular sealing assemblies are indicated schematically at 18 and they are carried by the end walls of the body in such a manner as to surround the flow passages 11. These sealing assemblies serve to establish fluid-tight seals between the body and the adjacent side working surfaces of the gate when the valve is in full open or full closed positions. While it is common to provide two valve assemblies, one on each side of the gate, in some instances a single assembly is used.

Figure 2:
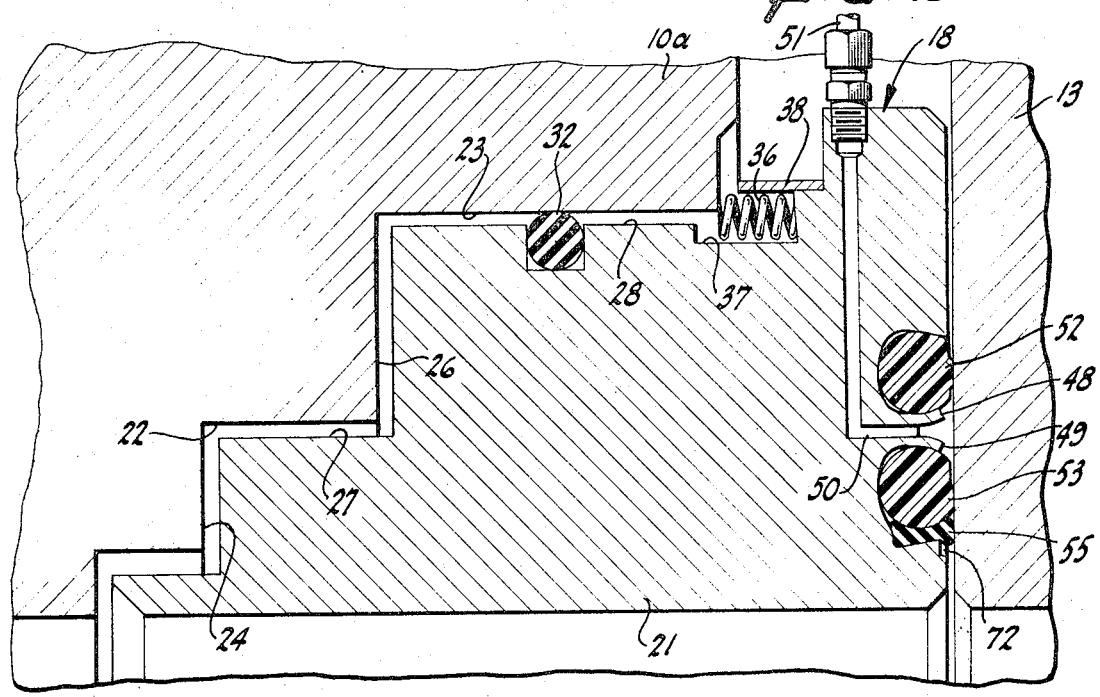
FIG. 2 is an enlarged detail in section illustrating one of the sealing assemblies incorporated in FIG. 1.

FIG. 2 illustrates one of the sealing assemblies 18. It includes a relatively rigid annular seat member 21 which can be made of suitable metal. One end portion of this member is fitted in a recess machined in the adjacent end wall 10a of the body. The recess in this instance is defined by two cylindrical peripheral surfaces 22 and 23 which are on different diameters, together with the flat annular shoulder surfaces 24 and 26. The annular seat member 21 is formed to provide corresponding peripheral surfaces 27 and 28 which slidably interfit the surfaces 22 and 23. Suitable sealing means, such as the resilient rings 32 of the O-ring type, is carried by the annular member 21 and in this instance establishes a fluid-tight seal between this member and the surface 23 of the body.

Spring means is provided for urging the annular seat member 21 toward the valve gate 13. Thus a plurality of circumferentially spaced coil compression springs 36 are disposed in the annular recess 37 formed in the member 21. This recess is closed on one side by retainer ring 38 which is attached to member 21 by suitable means such as welding.

The various parts assembled with the annular seat member 21 can best be understood by reference to FIGS. 3 – 7. A pair of concentric annular recesses 41 and 42 are formed in the seat member and have their open sides interrupting the surface 43 on that end portion of the member 21 which is in proximity with the valve gate. The recess 41 is defined by peripheral wall surfaces 44a and 44b and a bottom surface 44c. The recess 42 is similarly defined by the peripheral wall surfaces 46a and 46b and the bottom surface 46c. The wall surfaces 44a and 46a are shown as generally conical, and the surfaces 44b and 46b (before assembly as in FIG. 3) as generally cylindrical. The bottom surfaces 44c and 46c may be generally arcuate (as viewed in section). In addition to forming the recesses 41 and 42 by suitable machining operations, an annular groove 47 is formed in the metal which lies between the recesses 41 and 42, thereby forming annular bendable lip portions 48 and 49. A duct 50 may be formed in the seat member 21 to provide communication between the groove 47 and a fitting on the exterior of the valve body, by way of the connecting tube 51.

Annular means of resilient material are mounted in the recesses 41 and 42. Thus the ring 52 is disposed in recess 41 and ring 53 together with resilient annulus 55 is disposed in recess 42. The rings 52 and 53 are made of relatively hard resilient non-metallic material such as nylon, Teflon, Kel-F, or the like. By way of example, the rings 52 and 53 may be made of nylon having a durometer hardness as measured on the D scale ranging from 85 to 90. The annulus 55 is made from a more resilient material, as for example, a suitable synthetic rubber or elastomer having a durometer hardness on the A scale ranging from about 60 to 90.

The rings 52 and 53 can be fabricated from a standard nylon bar or rod bent into the form of a circle, with its ends cemented together. In the embodiment illustrated, the stock from which the rings are fabricated has a generally circular cross-section. The annulus 55 can be made in the form of a band of suitable size, or a strip of suitable length with its ends cemented together to form a band.

To assemble the parts shown in FIG. 3, the annulus 55 is positioned in contact with the surface 46a, and the nylon rings 52 and 53 are seated upon the bottom surfaces 44c and 46c. In general, the fits within the recesses can be relatively snug whereby the rings and annulus are lightly retained within the recesses. In other words, as positioned within the recesses there may be a slight amount of radial compression of the annular parts to provide retention to prevent accidental falling out of the recesses during subsequent operations. The next step is to bend the lip portions 48 and 49 in opposite directions to the locking positions shown in FIG. 4. This serves to effect some radial squeezing of the ring 52 and some radial distortion of ring 53. The direction of radial distortion of ring 53 is against the relatively resilient annulus 55, with the result that this annulus is distorted and compressed radially. Thus the resilient material is firmly locked within the accommodating recesses 41 and 42. The bending of the annular lip portions 48 and 49 can be carried out by a suitable tool which is traversed between the lip portions and operative to engage and roll or bend over the lips individually or simultaneously.

One manufacturing procedure is as follows. With the seat ring in a suitable lathe, machining operations serve to form the recesses 41 and 42. For example, with a 36 inch pipeline valve, the annular seat member 21 may have a mean diameter of about 38 inches, the recess 42 a radial width of the order of ¼ to ⅜ inch, and recess 41 a radial width somewhat less than that of recess 42. The recesses may be separated by a radial distance of about ¼ inch to ⅜ inch, and the groove 47 may have a width of about ⅛ inch. The nylon rings 51 and 52 can be conveniently fabricated by softening suitable lengths of nylon rod by immersion in boiling water after which the rods are bent to the form of a circle and their ends secured together by cement. The ring 52 should be of such diameter that it can be applied over the surface 44b without undue pressure. Likewise the ring 53 should be of such diameter that it can be inserted within and in peripheral contact with the surface 46b without undue force. The annulus 55 can be positioned on the peripheral surface 44a before the nylon ring 53 is positioned within the recess, or if desired, the annulus 55 can first be applied to the periphery of ring 52 and the two parts simultaneously positioned within the recess. In some instances it may be desirable to apply a suitable cement to the surfaces of the recess and the contacting surfaces between the nylon rings and the annuluses before effecting assembly within the recesses. However, with the clamping and locking action provided by the lip portions 48 and 49 such additional bonding is generally not necessary. The operations following introducing the resilient members and locking within the accommodating recesses by bending or rolling over the portions 48 and 49 are preferably carried out while the seat member 21 remains in the lathe. As previously explained, these lip portions may be bent individually or simultaneously by a common tool. During this operation, it may be desirable to provide light retaining pressure to hold the resilient assemblies within their accommodating recesses 41 and 42.

FIG. 4 shows the assembly immediately after bending the portions 48a and 49a. The next operation is to trim away the projecting portions of the rings 52 and 53 and the annulus 55. This trimming can be carried out by a suitable grinding or cutting tool while the seat member 21 remains within the lathe. As shown in FIG. 5, it is desirable to trim away the ring 52 to provide the flat surface 57 for contacting the valve gate, with this surface being in a plane slightly offset from the metal surface 43. The ring 42 is similarly trimmed away to provide the surface 59 which is coplanar with the surface 57. Also annulus 55 is trimmed away to form sealing surface 70, which is offset a small amount from surface 59. It is desirable to relieve the metal in the region 72 adjacent to the annulus 55 to avoid possible pinching of the rubber.

Assuming that the overall assembly is completed substantially as shown in FIG. 5, operation is as follows. Assuming that the gate is in closed position without fluid pressure being applied to either of the fluid passageways 11, the compression springs 36 urge the two annular seat members 21 toward the gate. For each sealing assembly the spring loading forces against the gate are sufficient to cause some compression of the annulus 55, whereby both the nylon surfaces 57 and 59 and the end face 70 of the more resilient annulus 55 are caused to contact the gate. This is the condition illustrated in FIG. 6. Considering now the left-hand sealing assembly 18 of FIG. 1, and assuming that the left-hand flow passage 11 becomes the upstream side of the valve and that a substantial fluid pressure is applied, the upstream seal is established by the annulus 55 and the portion of this annulus adjacent the gate surface 70 is supported to resist the applied pressure differential by the adjacent periphery of the nylon ring 53. The effective diameter of the seal thus established between the sealing assembly and the gate is the mean diameter of the surface 70 of annulus 55. This diameter is somewhat less than the diameter of the cylindrical surface 23 which is contacted by the O-ring 32 whereby a fluid pressure area is provided to cause pressure differential between the upstream side of the valve and the valve body space to urge the seat ring 21 toward the gate. In other words, under such condition, the loading of the compression springs 36 is supplemented by fluid pressure loading.

If the pressure in the body space should be somewhat higher than the pressure on the upstream side of the valve, such pressure is automatically relieved. This is because annulus 55 does not seal against body pressure. Also body pressure tends to urge the seat member away from the gate.

Assuming that seals are used on both sides of the gate and that the right-hand side of the valve as shown in FIG. 1 is the upstream side to which pressure is being applied, then with the valve in closed position the gate is urged against the sealing assembly on the downstream side. Thus the thrust of the gate on the downstream side is against the nylon rings 52 and 53, and if the thrust is sufficiently high, these rings are compressed to a sufficient extent to permit the gate to come into direct engagement with and press against the metal surface 43.

While the annulus 55 forms an effective seal against pressure applied to its inner periphery, the ring 52 forms only an approximate seal. Thus if any pressure should leak past annulus 55 into the space 47, it may escape past the ring 52, thus preventing pressure build-up between the rings 52 and 53.

The self-relieving action described above prevents the erratic action or pumping previously described in connection with seals of the type disclosed in U.S. Pat. No. 3,269,695. This is because there is no opportunity at any time for pressure to build up or to be trapped between the two sealing areas, having reference particularly to trapped pressure sufficient to cause the erratic action.

Under certain conditions it is desirable to introduce a plastic sealant through the duct 50, with the result that this sealant is introduced into the groove 47 and becomes effective to ensure a seal with respect to the gate. The approximate seal afforded by ring 52 makes it possible to apply the sealant with substantial pressure whereby it is spread over a substantial annular area of the gate valve surface.

As indicated in FIG. 1, the two sealing assemblies 18 may be identical in construction. With such a valve, either one of the flow passages 11 may be the upstream side of the valve, and the seal is established on the upstream side of the gate.

The invention described above has a number of desirable features. Particularly, the sealing means engages the valve surface on the gate on two concentric areas, without the inherent disadvantages of seals of this type. The assembly is not subject to build-up of pressure between the concentric sealing areas, which causes erratic operation as previously described. This is because the assembly is self-relieving, thus avoiding any substantial pressure build-up. The two resilient rings 52 and 53 are securely retained within their accommodating recesses by the bent lip portions 48 and 49. The procedure for manufacturing such a sealing assembly is relatively simple and does not require molding or pressing-in operations.

Figure 8:
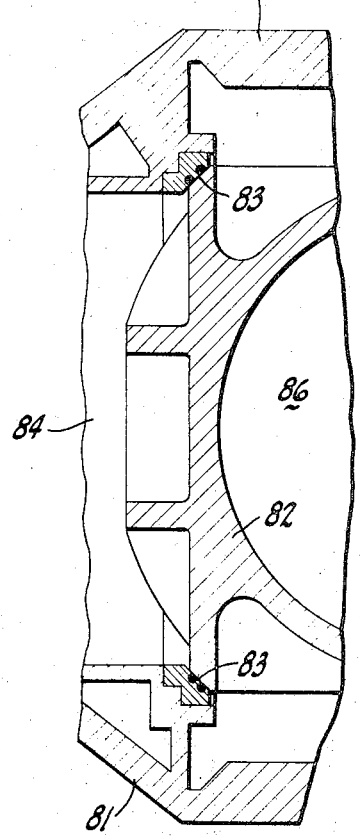
FIG. 8 is a cross-sectional view showing portions of a valve of the ball type incorporating the invention.
Figure 9:
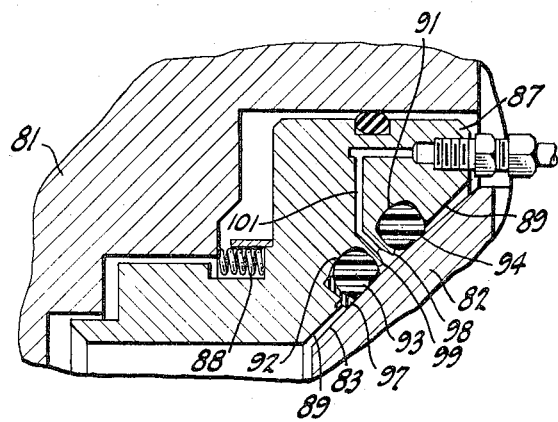
FIG. 9 is an enlarged detail in section illustrating the sealing assembly incorporated in FIG. 8.

FIGS. 8 and 9 illustrate the invention incorporated in a valve of the ball type. The valve includes a body 81 and a valve member 82 in the form of a ball having a spherical valve working surface 83. The body is formed to provide aligned flow passages 84, and the valve member 82 has a transverse port 86 which is adapted to register with the flow passages 84 when the valve is in open position. It is assumed that the valve body 81 is provided with trunnions for supporting the ball for turning movement about its vertical axis, the trunnions also serving to carry the thrust of fluid pressure against the ball when the valve is in its closed position.

The annular seat member 87 is fitted into a recess provided in the valve body, and it is urged toward the valve ball as by compression springs 88. The end face of the annular member 87 which is in proximity with the valve ball is machined to provide a generally spherical or conical surface 89. This surface is spaced short distance from the adjacent valve working surface of the ball. The concentric annular recesses 91 and 92 corresponding to the recesses 41 and 42 of FIG. 3 serve to accommodate resilient parts as previously described. Thus the parts include the rings 94 and 95 made of relatively hard resilient material like nylon and the more resilient annulus 97 made of suitable material such as synthetic rubber or elastomer. Here again lips 98 and 99 have been bent in opposite directions for the purpose of securely locking the resilient parts within their accommodating recesses. Duct 101 may connect with a fitting exterior of the valve body for introducing a plastic sealant.

Figure 10:
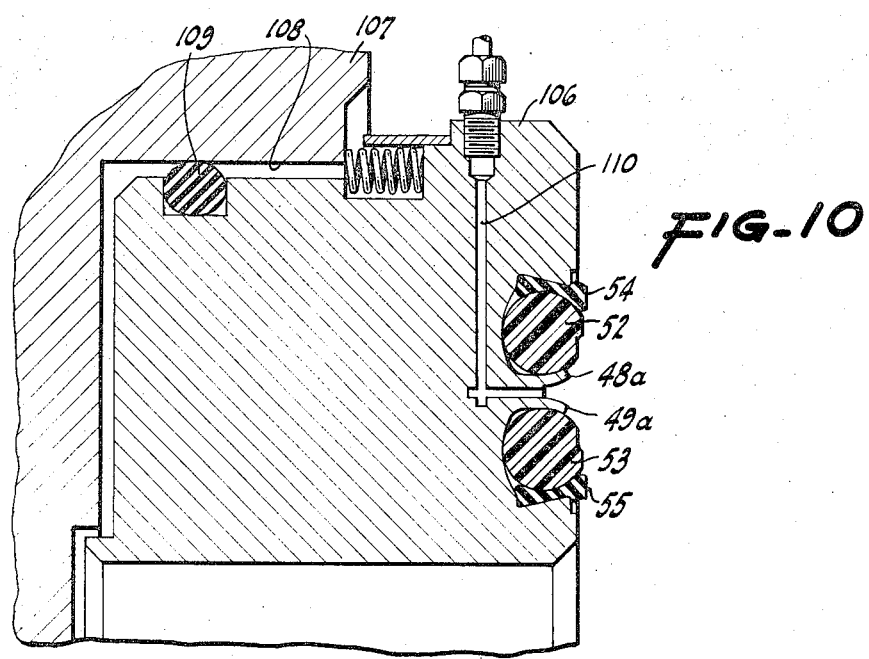
FIG. 10 is an enlarged detail in section similar to FIG. 2, but showing another embodiment.
Figure 11:
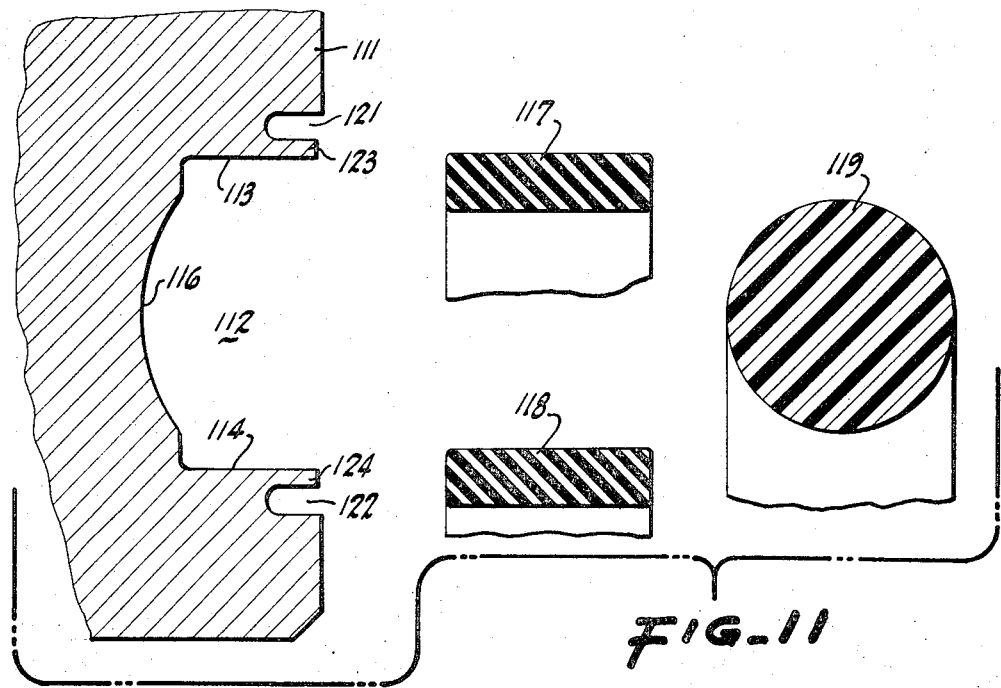
FIG. 11 is an exploded view in section showing another embodiment.

FIG. 10 shows another embodiment suitable for a gate valve. In this instance the annular seat member 106 is accommodated within a recess formed in the body part 107. This recess provides the cylindrical surface 108 which is engaged by the seal 109 of the O-ring type carried by the seat member 106. The nylon rings 52 and 53 and annulus 55 are locked within recesses formed in one end portion of the ring 106 in the same manner as shown in FIG. 5. Duct 110 permits introduction of a plastic sealant, the same as in FIG. 2. The diameter of the sealing area established by annulus 55 is smaller than the diameter of the cylindrical surface 108. Thus when assemblies of this type are provided on both sides of a gate valve as shown in FIG. 1, fluid pressure on the upstream side will act upon a pressure area of the assembly to urge the same toward the gate. In other words, with this arrangement fluid pressure differential supplements the force of the compression springs to urge the sealing assembly against the valve member on the upstream side of the valve. Also with such an assembly, if substantial pressure differential exists between the body space and the upstream side of the valve, the assembly will be urged toward retracted position to permit body pressure to be relieved.

Figures 12, 13, 14:
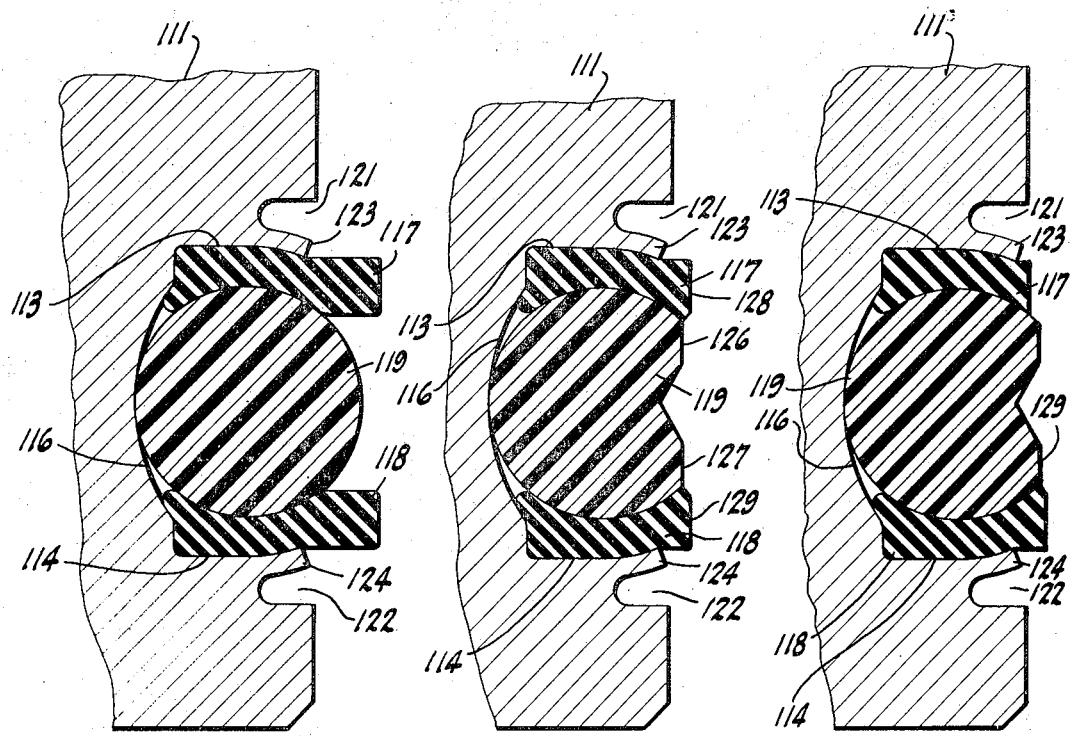
FIG. 12 is a detail in section showing the assembly of resilient material locked into its accommodating recess.
FIGS. 13 and 14 show the two ways in which the resilient material may be trimmed.

FIGS. 11 – 14 illustrate another embodiment of the invention using a single recess. Thus the annular seat member 111 is provided with an annular recess 112 that is defined by the outer and inner peripheral surfaces 113 and 114 and the bottom surface 116. The resilient rubber annuluses 117 and 118 are positioned within the recess together with the nylon ring 119, whereby the annuluses are interposed between the outer and inner peripheries of ring 119 and the surfaces 113 and 114. The member 111 is provided with grooves 121 and 122 to form bendable lip portions 123 and 124. These lip portions are bent to the positions shown in FIG. 12, whereby they compress the resilient material and lock the assembly within the recess. The projecting portions are then trimmed away to provide the annular nylon surfaces 126 and 127 and the more resilient surfaces 128 and 129. In some instances the annuluses 117 and 118 can be trimmed as shown in FIG. 14 to provide a sealing face 129 without providing a sealing face for annulus 117.

When used on gas flow lines the assembly of FIG. 13 can be used without experiencing the pumping action previously described. However, for liquid flow lines the assembly of FIG. 14 is preferred. Also when used to control gas flow, assemblies as shown in FIGS. 2 – 10 may have a more resilient sealing annulus (like 54) associated with the outer periphery of ring 52.

We claim:

1. In a valve construction, a valve body having aligned flow passages, a valve member within the body movable between open and closed positions, the valve member having at least one valve working surface, and an annular sealing assembly carried by the body and surrounding one of the flow passages for closed position of the valve, the sealing assembly including an annular rigid seat member carried by the body and sealed with respect to the same, said member having one annular end face of the same disposed adjacent said valve working surface and formed to provide annular recessing, annular sealing means of non-metallic resilient material disposed in said annular recessing, said end face also being provided with annular grooving to provide two annular lips adjacent peripheral surfaces of the sealing means, said lips being bent in opposite directions into locking engagement with the annular sealing means, the width of each lip portion when viewed in section being substantially less than the depth of the recessing.

2. A valve as in claim 1 in which the said sealing means consists of a ring of relatively hard resilient non-metallic material together with two annuluses of more resilient material adjacent the outer and inner peripheral surfaces of the ring, the two annular lip portions being bent toward the sealing means to lock the same within the recess.

3. A valve as in claim 1 in which the recessing provides two radially spaced recesses and in which the sealing means includes two annuluses of non-metallic resilient material disposed within the recesses, the lip portions being between the two annuluses, the grooving being between the lips.

4. In a valve construction, a valve body having aligned flow passages, a valve member within the body movable between open and closed positions, the valve member having at least one valve working surface, and a sealing assembly carried by the body and surrounding one of the flow passages for closed position of the valve, the sealing assembly including an annular rigid seat member carried by the body and sealed with respect to the same, one end portion of said member having an end face disposed adjacent said valve working surface, radially spaced first and second concentric annular recesses formed in said end portion of the annular member, rings made of non-metallic resilient material fixed in each of said recesses and adapted to contact said valve working surface, said end portion of the seat member having an annular groove formed between said recesses, and means between said recesses and said groove for locking the rings within the recesses, said means comprising two concentric and oppositely bent annular lip portions formed integral with the seat member, the lip portions when viewed in section having a width substantially less than the depth of the recesses.

5. A valve as in claim 4 in which a groove is formed in the metal of the seat member between said recesses, said groove serving to form said lip portions.

6. A valve as in claim 4 in which one of said recesses accommodates a ring formed of relatively hard resilient material and an annulus of non-metallic resilient material more resilient than the material of said ring interposed between the annular ring and one peripheral surface of the recess, said annulus being radially compressed and having a surface disposed to contact and establish a seal with respect to the valve working surface.

* * * * *